(12) United States Patent
Salter et al.

(10) Patent No.: US 11,639,155 B2
(45) Date of Patent: May 2, 2023

(54) WINDSHIELD WASHER FLUID BOTTLE HEATER

(71) Applicant: Ford Global Technologies, LLC, Dearborn, MI (US)

(72) Inventors: Stuart C. Salter, White Lake, MI (US); Paul Kenneth Dellock, Northville, MI (US); David Brian Glickman, Southfield, MI (US); Phillip Marine, Royal Oak, MI (US); John Budaj, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 788 days.

(21) Appl. No.: 16/551,789

(22) Filed: Aug. 27, 2019

(65) Prior Publication Data

US 2021/0061232 A1    Mar. 4, 2021

(51) Int. Cl.
*B60S 1/48* (2006.01)
*H05B 3/06* (2006.01)
*B60S 1/50* (2006.01)
*F28F 3/02* (2006.01)

(52) U.S. Cl.
CPC ............... *B60S 1/488* (2013.01); *B60S 1/50* (2013.01); *F28F 3/02* (2013.01); *H05B 3/06* (2013.01)

(58) Field of Classification Search
CPC ............ B60S 1/524; B60S 1/48; B60S 1/488
See application file for complete search history.

(56) References Cited

U.S. PATENT DOCUMENTS

| | | | | |
|---|---|---|---|---|
| 9,834,179 B2* | 12/2017 | Caillot | ............... | B60S 1/488 |
| 9,890,314 B2* | 2/2018 | Chen | ............... | F24S 10/45 |
| 2012/0000458 A1* | 1/2012 | Zhang | ............... | F24S 60/30 |
| | | | | 126/640 |
| 2012/0174333 A1 | 7/2012 | Heidacker | | |
| 2012/0183281 A1* | 7/2012 | Sato | ............... | B60S 1/488 |
| | | | | 392/441 |
| 2015/0194557 A1* | 7/2015 | Williams | ............... | F24S 25/20 |
| | | | | 136/248 |
| 2016/0001196 A1* | 1/2016 | Shown | ............... | B01D 1/0047 |
| | | | | 203/40 |
| 2018/0195808 A1* | 7/2018 | Lambertson | ....... | F24C 15/2021 |
| 2018/0231331 A1* | 8/2018 | Abbasi | ............... | F28D 19/02 |

FOREIGN PATENT DOCUMENTS

DE     202015100468 U1    2/2015
EP          3159227 A1       4/2017

OTHER PUBLICATIONS

Clevenger, Seth, "Seeva Introduces Washer-Fluid Heating System for Windshields, Onboard Sensors," Transport Topics, posted online Mar. 4, 2018.

* cited by examiner

*Primary Examiner* — Michael D Jennings
(74) *Attorney, Agent, or Firm* — Vichit Chea; Carlson, Gaskey & Olds, P.C.

(57) ABSTRACT

A disclosed windshield washer fluid storage system includes a fluid storage container with a thermal interface. The thermal interface provides for the transference of thermal energy into the container from a heat producing electrical component. Thermal energy from the component is communicating into the container to cool the component and heat washer fluid within the container.

9 Claims, 3 Drawing Sheets

WINDSHIELD WASHER FLUID BOTTLE HEATER

TECHNICAL FIELD

This disclosure relates to a window washer bottle that utilizes heat from an electrical device for warming washer fluid.

BACKGROUND

Vehicles store window washer fluid within a bottle typically disposed within an engine compartment. Windshield washer fluid is utilized in all environmental conditions and is stored at ambient temperature. Warming of the windshield washer fluid can increase effectiveness, especially in colder environments. Vehicles are increasingly incorporating electrically powered devices that generate heat. Electrically powered devices operate most effectively at lower temperatures, however, efficiently cooling such electrical devices without excessive additional systems is a challenge.

SUMMARY

An windshield washer fluid storage system according to an exemplary aspect of the present disclosure includes, among other things, a fluid storage chamber defined by side walls, a bottom wall and a top, and a thermal interface for transference of thermal energy into the fluid storage chamber, the side walls and the bottom wall.

A further non-limiting embodiment of the foregoing system wherein the side walls include a wall thickness that varies in a direction way from the thermal interface.

A further non-liming embodiment of any of the foregoing systems wherein the wall thickness of the side walls decreases in a direction away from the thermal interface.

A further non-liming embodiment of any of the foregoing systems wherein the bottom wall includes an interior surface and an exterior surface and the exterior surface comprises the thermal interface.

A further non-liming embodiment of any of the foregoing systems includes cooling fins extending from at least one of the side walls.

A further non-liming embodiment of any of the foregoing systems includes cooling fins extending from the top.

A further non-liming embodiment of any of the foregoing systems includes a thermally conductive coating on the exterior surface.

A further non-liming embodiment of any of the foregoing systems includes a heat generating electrical device in thermal transferring contact with the thermal interface.

A further non-liming embodiment of any of the foregoing systems wherein the heat generating electrical device comprises a converter.

A further non-liming embodiment of any of the foregoing systems wherein the side walls, bottom wall and top are formed from a thermally conductive plastic material.

A further non-liming embodiment of any of the foregoing systems wherein the thermally conductive plastic material comprises a polycarbonate with between 15% and 25% by volume of one of aluminum nitride and boron nitrate.

A fluid storage system according to an exemplary aspect of the present disclosure includes, among other things, a fluid storage chamber defined by side walls, a bottom wall and a top, wherein the bottom wall comprise a thermal interface for transference of thermal energy into at least the side walls and a heat producing electrical component in thermal contact with the thermal interface and communicating thermal energy into the side walls, bottom wall and top during operation.

In a further non-limiting embodiment of the foregoing system, the heat producing electrical component comprises an electric power converter.

In a further non-limiting embodiment of any of the foregoing systems, the side walls include a wall thickness that decreases in a direction away from the thermal interface.

A further non-limiting embodiment of any of the foregoing systems, includes cooling fins extending from at least one of the side walls and top.

In a further non-limiting embodiment of any of the foregoing systems, the side walls, bottom wall and top are formed of thermally conductive plastic material comprising a polycarbonate with between 15% and 25% by volume of one of aluminum nitride and boron nitrate.

A method according to another exemplary aspect of the present disclosure includes, among other things, assembling a fluid storage chamber defined by side walls, a bottom wall and a top and forming the bottom wall to define a thermal interface for transference of thermal energy into at least the side walls, mounting a heat producing electrical component to contact the thermal interface, communicating thermal energy from the electrical component into the side walls, bottom wall and top, and dissipating thermal energy into the ambient environment through the side walls, bottom wall and top.

A further non-limiting embodiment of the foregoing method, includes forming the side walls, bottom wall and top from a thermally conductive plastic material comprising a polycarbonate with between 15% and 25% by volume of one of aluminum nitride and boron nitrate.

A further non-limiting embodiment of any of the foregoing methods, includes forming the side walls to include a wall thickness that decreases in a direction away from the thermal interface.

A further non-limiting embodiment of any of the foregoing methods, includes forming cooling fins on at least one of the side walls and the top.

The various features and advantages of this disclosure will become apparent to those skilled in the art from the following detailed description. The drawings that accompany the detailed description can be briefly described as follows.

DETAILED DESCRIPTION

Figure 1:
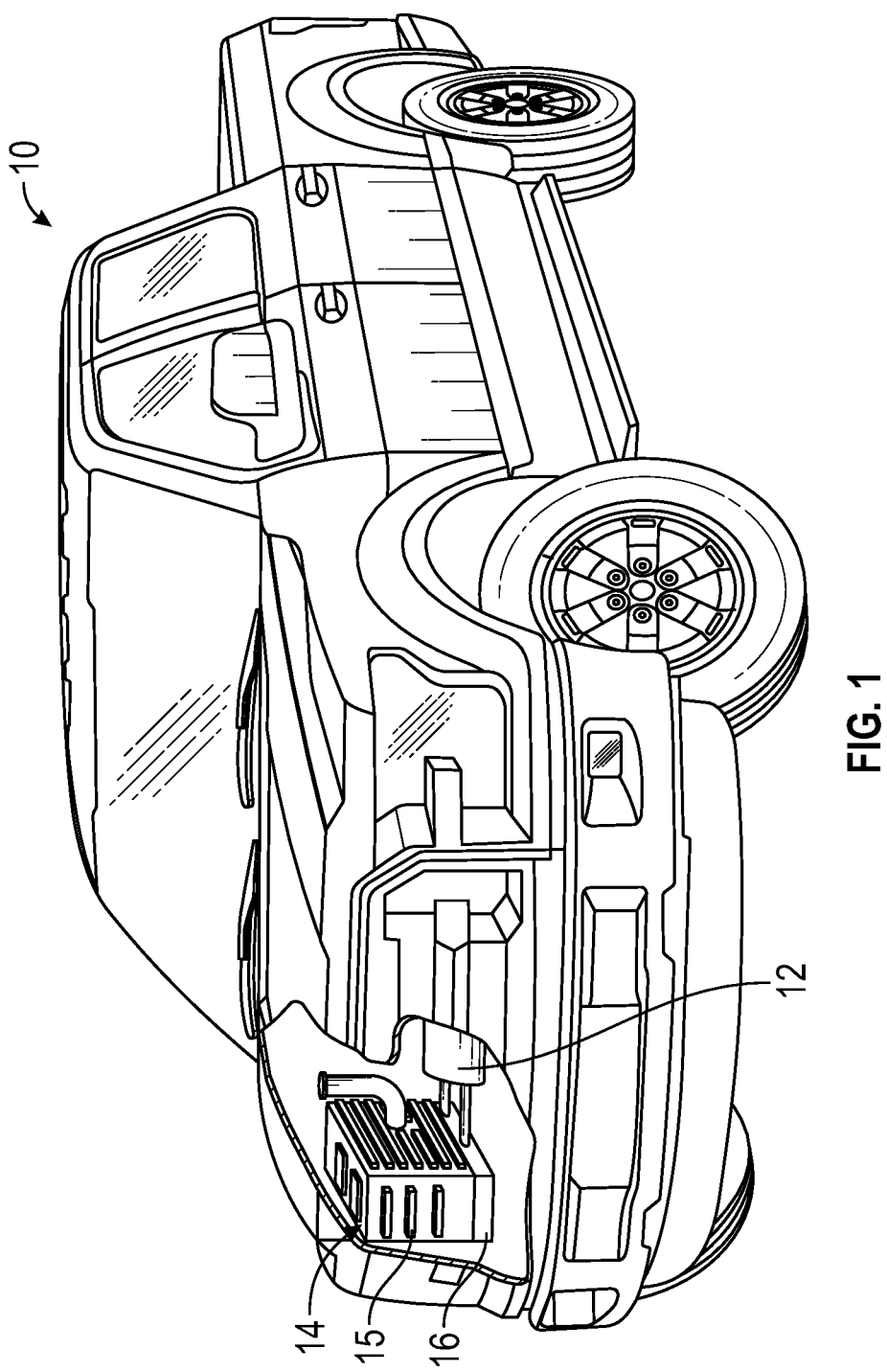
FIG. 1 is a schematic view of a vehicle including a window washer fluid storage system.

Referring to FIG. 1, a vehicle 10 includes a windshield washer fluid storage system 14 and an electrical system 12 including a power converter 16. The power converter 16 is mounted to a windshield washer fluid container 15. The example converter is a DC to DC converter that provides power to the vehicle electric system in a manner required to operate electronic devices. The DC to DC converter 16 generates heat that is dissipated to maintain the converter 16 within a desired temperature range. One example of a desired temperature range is from around 125° F. to 140° F. (51° C. to 60° C.). The temperatures are approximations and each converter may have a unique desired operational temperature range. The disclosed converter 16 is mounted to the windshield washer fluid container 15. The disclosed example windshield washer fluid container 15 holds windshield washer fluid and also includes features for dissipating heat generated by the converter 16.

Figure 2:
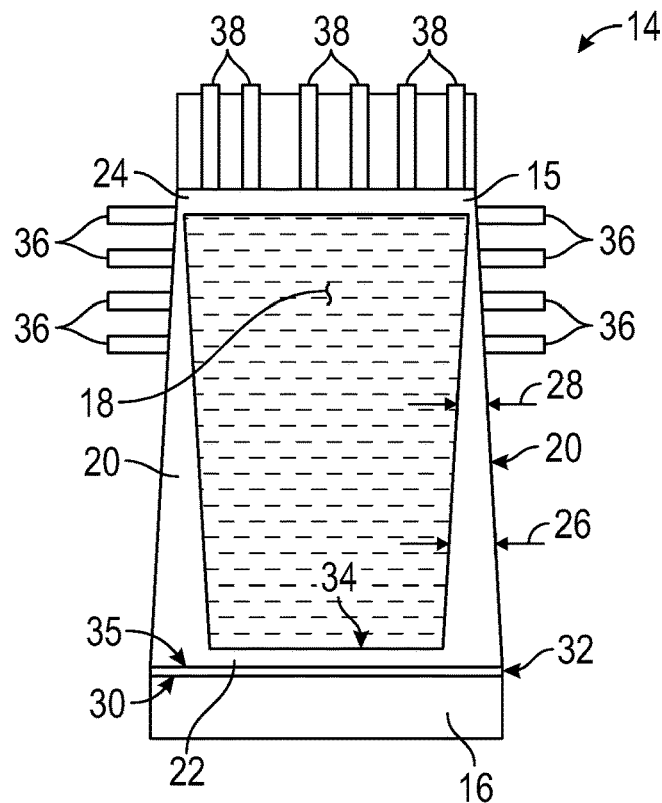
FIG. 2 is a schematic cross-section of an example windshield washer fluid container.

Referring to FIG. 2, with continued reference to FIG. 1, the example container 15 includes a chamber 18 for holding windshield washer fluid. The chamber 18 is defined by side walls 20, a bottom wall 22, and a top 24. The container 15 includes a thermal interface 30 that abuts a surface 35 of the converter 16 mounted in thermal contact with the container 15. In this example, the converter 16 is mounted to the bottom wall 22 of the container 15.

Although a converter 16 is illustrated and described by way of example, other heat producing electrical devices may be mounted to the container 15 to dissipate heat through the walls 20 and washer fluid contained within the chamber 18. Moreover, although the container 15 is described by way of example as a windshield washer container, other fluid containers could also be utilized and are within the contemplation of this disclosure.

The container 15 is formed from a thermally conductive plastic material. In one example embodiment, the thermally conductive plastic material is a polycarbonate that includes between 15% and 25% by volume of a ceramic material. In one example embodiment, the ceramic material includes either aluminum nitride or boron nitrate. The example material may also include 2-5% maleic anhydride to stabilize the ceramic material with the base polymer plastic material. The thermally conductive material is also an electric insulator. It should be appreciated that although a specific type of thermally conductive plastic material is disclosed by way of example, other thermally conductive plastics and materials could be utilized to form the container 15 and are within the scope and contemplation of this disclosure.

The container 15 includes the side walls 20 that are tapered in a direction from the bottom wall 22 towards the top 24. In this disclosed embodiment, a first thickness 26 disposed near the bottom wall 22 that is thicker than a second thickness 28 that is disposed further up the wall 20 towards the top 24. Accordingly, each of the walls 20 are tapered such that they decrease in thickness in a direction away from the thermal interface 30.

Accordingly, the side walls 20 are the thickest near the thermal interface 30 and are thinner as they extend away from the thermal interface 30. The tapering of the walls provides for the conduction of heat away from the thermal interface 30 and the converter 16 such that the entire container 15 provides for the dissipation of thermal energy. The bottom wall 22 includes an interior surface 34 that forms a bottom surface of the chamber 18. Heat from the converter 16 is at least partially transferred through the interior surface 34 into fluid contained within the chamber 18. The tapered walls 20 encourage the dissipation of thermal energy or heat away from the converter 16 towards the top 24.

Cooling fins 36 are provided on the side walls 20 and cooling fins 38 are provide on the top 24. The cooling fins 36, 38 provide additional surface area to dissipate heat that is communicated through the thermal interface 30 at the bottom wall 22 and up the side walls 20 towards the top 24.

In one disclosed embodiment, a thermally conductive coating 32 is provided between the converter 16 and the thermal interface 30 that is the bottom wall 22 of the container 15. The thermally conductive coating 32 improves thermal transfer by filling in empty spaces or gaps that may form due to manufacturing imperfections. The coating 32 may be formed from any material that is compatible with both material of the container 15 and the converter 16. The coating 32 may be a sheet of material or layer deposited on the mating surfaces of the container 15 and the converter 16.

In one disclosed example, the side walls 20, the bottom wall 22, and the top 24 are separate parts that are assembled utilizing known attachment techniques, such as sonic welding or the use of adhesives or fasteners. In another embodiment, the container 15 is formed as two parts that are joined utilizing a joining process. The joining process may be any joining process suitable for joining of plastic materials, such as for example, ultrasonic welding. In another embodiment, the container 15 is a one piece formed shape formed in a process that enables fabrication into one piece. Moreover, the container 15 may be assembled in other shapes including multiple components that are attached together to form the fluid chamber 18 along with the side walls including the heat conduction features and fins.

Figure 3:
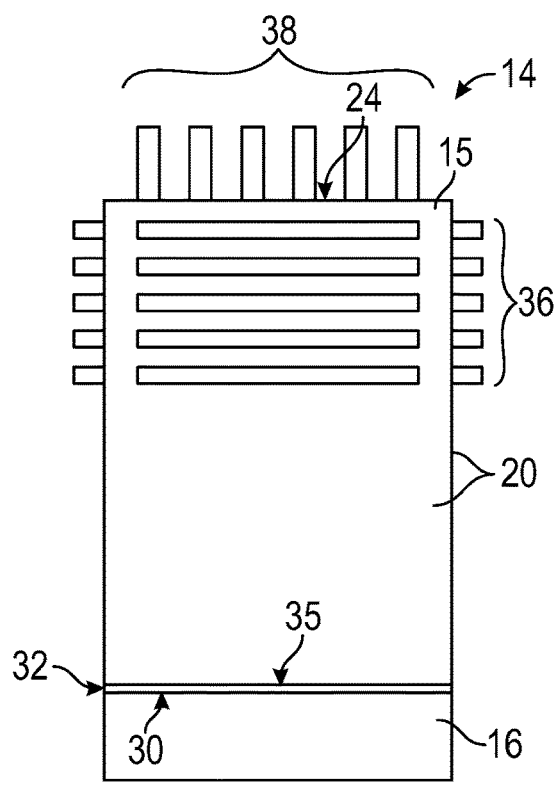
FIG. 3 is a side view of an example windshield washer fluid container.
Figure 4:
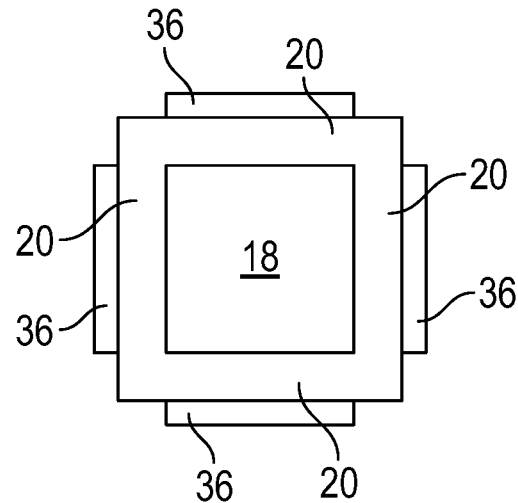
FIG. 4 is a top sectional view of the window washer container.

Referring to FIGS. 3 and 4, with continued reference to FIGS. 1 and 2, the example container 15 includes the cooling fins 36, 38 disposed near the top 24. The cooling fins 36, 38 enhance heat transfer to the ambient environment within the engine compartment of the vehicle 10. The chamber 18 is defined by the walls 20, 22 to provide a volume for storage of a washer fluid. Heat that is generated by the converter 16 is transferred through the thermal interface 30 into the side walls 20 in a direction toward the top 24 and the cooling fins 36, 38.

Heat from the converter 16 transferred into the walls 20, 22 is also communicated to fluid that may be contained within the chamber 18. It should be appreciated that although fluid within the chamber 18 will absorb heat produced the converter 16, the container 42 absent of fluid is also capable of conducting thermal energy away from the converter 16. The volume of fluid within the chamber 18 may vary and therefore the container 42 is defined and configured such that it provides a minimal amount of thermal transfer required to maintain the converter 16 at desired operating temperatures. The addition of washer fluid within the chamber 18 improves the thermal transfer and absorption capability of the container 42. Moreover, the thermal transfer of heat into washer fluid within the chamber provides heated washer fluid. Heated washer fluid provides improved cleaning efficiency of vehicle windows. The thermal energy from converter is therefore not wasted, but instead utilized for a useful purpose without substantial added systems and devices.

Figure 5:
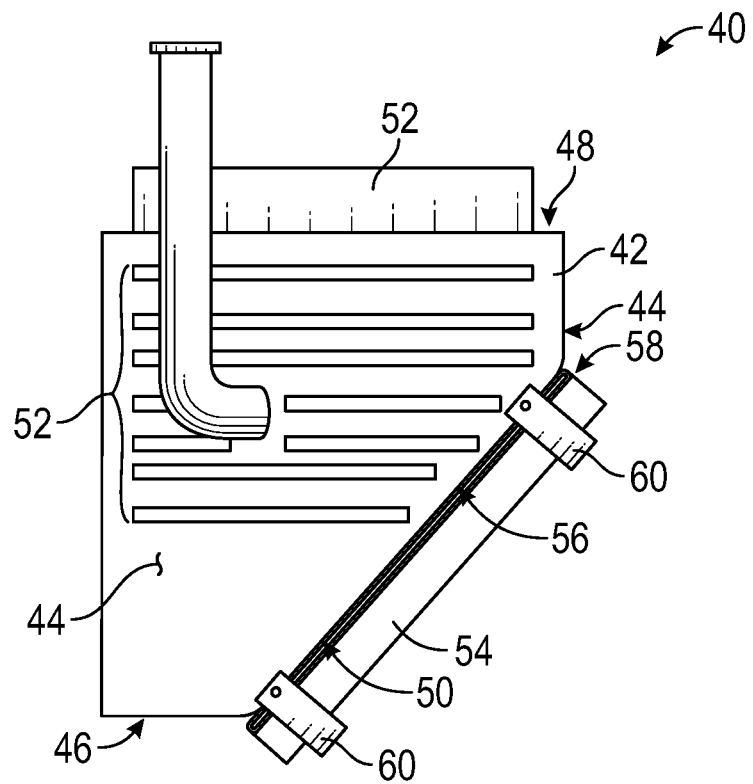
FIG. 5 is a side view of another windshield washer container embodiment.

Referring to FIG. 5, another washer fluid system 40 is shown that includes a container 42 with sides 44, bottom 46, a top 48 and an angled surface 50. An electrical device, such as a converter 54 is attached to the angled surface 50 to exemplify that the converter 54 need not be attached to a bottom surface, but may be attached to other surfaces of the container 42. In this disclosed embodiment, the angled side 50 provides the thermal interface 56 through which heat produced by the converter 54 is transmitted into the container 42. A thermally conductive coating 58 is provided at the thermal interface 56 between the angled surface 50 and the converter 54. The sides 44 include tapered walls that decrease in thickness in a direction away from the thermal interface 56 like that shown in FIG. 2.

The container 42 includes a plurality of fins 52 disposed on the sides 44 and top 48 to provide additional thermal conductivity and dissipation of heat into the ambient environment. Mounting of the container 42 to surfaces such as the angled surface 50 accommodates containers of various shapes that are defined to correspond with the packaging limitations present within a vehicle. As appreciated, the container 42 may be of any configuration and need not be a square, round, or any other common shape. The container 42 may take on a unique shape with unique contours to take advantage of available packaging space within a vehicle engine compartment.

Accordingly, the example windshield washer container system utilizes the existing washer fluid container for cooling of electric devices without the addition of other cooling systems or devices. Moreover, heat generated by an electrical component is utilized to heat the windshield washer fluid within the container 42 to provide desired benefits of having a warmer windshield washer fluid to more efficiently remove and clean debris from a vehicle windshield.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A windshield washer fluid storage system comprising:
   a fluid storage chamber defined by side walls, a bottom wall and a top;
   a thermal interface on an exterior surface of one of the side walls, bottom wall and top of the fluid storage chamber for transference of thermal energy into the fluid storage chamber, the side walls and the bottom wall, wherein the wall thickness of the side walls decreases in a direction away from the thermal interface; and
   cooling fins extending from at least one of the side walls.

2. The windshield washer fluid storage system as recited in claim 1, wherein the side walls include a wall thickness that varies in a direction away from the thermal interface.

3. The windshield washer fluid storage system as recited in claim 2, wherein the bottom wall includes an interior surface and the exterior surface.

4. The windshield washer fluid storage system as recited in claim 3, including a thermally conductive coating on the exterior surface.

5. The windshield washer fluid storage system as recited in claim 1, including cooling fins extending from the top.

6. A windshield washer fluid storage system comprising:
   a fluid storage chamber defined by side walls, a bottom wall and a top; and
   a thermal interface on an exterior surface of one of the side walls, bottom wall and top of the fluid storage chamber for transference of thermal energy into the fluid storage chamber, the side walls and the bottom wall including a heat generating electrical device in thermal transferring contact with the thermal interface.

7. The windshield washer fluid storage system as recited in claim 6, wherein the heat generating electrical device comprises a converter.

8. A windshield washer fluid storage system comprising:
   a fluid storage chamber defined by side walls, a bottom wall and a top; and
   a thermal interface on an exterior surface of one of the side walls, bottom wall and top of the fluid storage chamber for transference of thermal energy into the fluid storage chamber, the side walls and the bottom wall, wherein the side walls, bottom wall and top are formed from a thermally conductive plastic material.

9. The windshield washer fluid storage system as recited in claim 8, wherein the thermally conductive plastic material comprises a polycarbonate with between 15% and 25% by volume of one of aluminum nitride and boron nitrate.

\* \* \* \* \*